Aug. 28, 1962   J. R. WERTH   3,051,607
METHOD OF MAKING AN ASSEMBLY OF RELATIVELY MOVABLE MEMBERS
Filed March 1, 1960
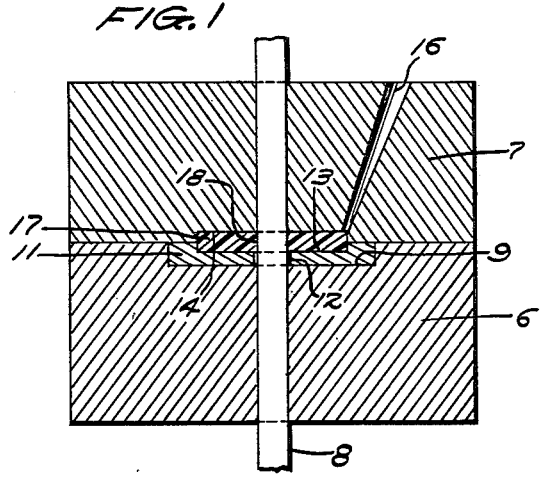
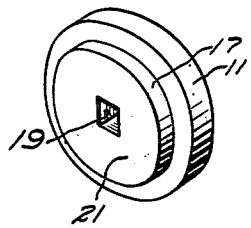
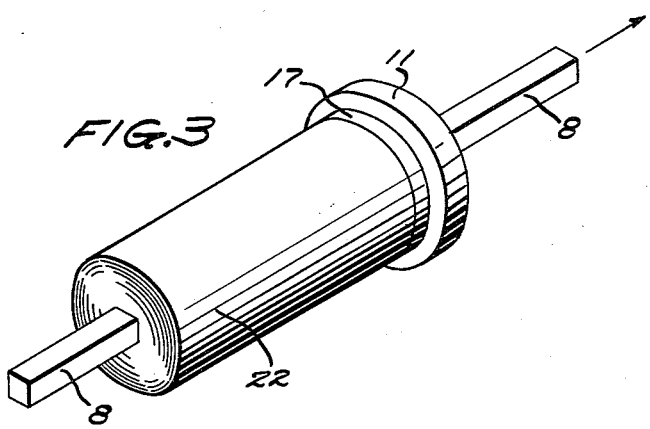
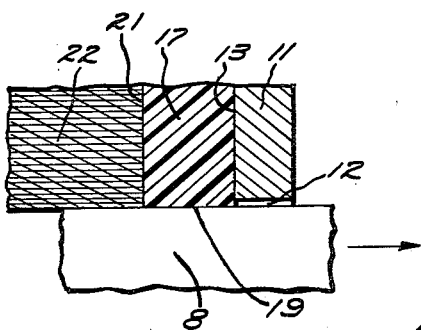
INVENTOR
J. R. WERTH
BY Robert E. Clamp
ATTORNEY

3,051,607
METHOD OF MAKING AN ASSEMBLY OF RELATIVELY MOVABLE MEMBERS
Joseph R. Werth, Chicago, Ill., assignor to Western Electric Company, Incorporated, New York, N.Y., a corporation of New York
Filed Mar. 1, 1960, Ser. No. 12,166
8 Claims. (Cl. 156—242)

This invention relates to a new and improved method of making an assembly of relatively movable members to close tolerances with respect to one another and more particularly to a new and improved method of making an arbor stripper for removing wound metallized Mylar capacitor material from a winding arbor.

In the past, it has been the practice in the manufacturing of metallized Mylar capacitors to wind the metallized material on an arbor positioned through an aperture in a metal stripper fixed in position in the winding device, and then to move the arbor relative to the stripper to remove the wound material from the arbor. The wound material could not properly in all instances be removed from the arbor with this procedure, however, even where the aperture in the metal stripper was machined to a close tolerance with respect to the outer surface of the arbor, due primarily to the thinness of the Mylar material. This was especially true where the edge of the wound material adjacent the metal stripper was uneven, with some of the inner layers extending outwardly of the remainder of the layers.

An object of this invention is to provide a new and improved method of making an assembly of members which are movable relative to one another, to close tolerances with respect to one another.

Another object of this invention is to provide a new and improved method of making a winding arbor and winding arbor stripper assembly.

A further object of this invention is to provide a new and improved method of making a winding arbor and winding arbor stripper assembly, wherein the stripper is formed directly on the winding arbor and presents a close fit therewith without machining of the stripper aperture.

A still further object of this invention is to provide a new and improved method of making a winding arbor and winding arbor stripper assembly, wherein the stripper is formed by casting epoxy resin around the winding arbor, the epoxy resin hardening into a stripper element forming a close fit with respect to the arbor.

With these and other objects in view, the present invention contemplates a method of making a winding arbor and winding arbor stripping assembly wherein a portion of the arbor is coated with a release agent and an epoxy resin element is then cast in a mold on the arbor around the coated portion thereof. After the epoxy resin has set, the mold and the epoxy resin element are removed from the arbor and the front face of the element is machined so as to present a smooth wound material engaging surface. The epoxy resin element is then mounted in operating position and is used for stripping the wound material from the arbor in a conventional manner.

Other objects, advantages and novel aspects of the invention will become apparent upon consideration of the following detailed description in combination with the accompanying drawings wherein:

FIG. 1 illustrates an apparatus and method whereby a stripper element may be formed on a winding arbor according to the present invention;

FIG. 2 shows a finished arbor stripper as it appears removed from the winding arbor;

FIG. 3 shows a winding arbor having capacitor material wound thereon, illustrating the manner in which the winding arbor is moved relative to the arbor stripper to remove the winding material from the arbor; and FIG. 4 is an enlarged detailed sectional view illustrating the manner in which the stripper element engages the wound capacitor material to remove the same from the winding arbor.

Referring to FIG. 1, an apparatus for constructing a stripper according to the present invention may comprise a pair of mold halves 6 and 7 clamped together by suitable means (not shown) and supported on a winding arbor 8 mounted in a conventional manner. The mold half 6 is provided with a recess 9 which receives a metal base member 11 having an aperture 12 formed therein, the aperture 12 being slightly larger than the cross-section of the arbor 8 (see FIG. 4) so that the member 11 is freely movable thereon. The metal base member 11 has a recess 13 which surrounds the aperture 12 to form a portion of a cavity for receiving epoxy resin. The mold half 7 has a recess 14, corresponding to the recess 13 in the metal base member 11, which forms the other portion of the epoxy resin receiving cavity. A feed passage 16 is provided in the mold half 7 leading from an outer extremity of the mold half to the cavity formed by the recesses 13 and 14.

The epoxy resin used to form the cast element 17 is preferably of a type which is slightly resilient when it has hardened so that it can absorb the initial shock of the wound material striking thereagainst during a removing operation, and should also have a good adhesive quality so as to adhere to the metal base member 11. In this respect, while various mixtures may be used, favorable results are obtained using an epoxy resin consisting essentially of 7 parts of Epi–rez 510 (Jones-Dabney Company) and 3 parts of Genamid 250 (General Mills Corporation) as a converter. In this respect, Epi–rez 510 is the reaction product of a polyhydric phenol, such as bisphenol–A, and epicholorohydrin, while Genamid 250 is a polyamide resin.

The arbor stripper element 17 is formed on the arbor 8 according to the present invention by coating the mold half cavity 14, feed passage 16 and a portion of the arbor as at 18, with a suitable release agent such as Dow Corning Mold Release (a heat stable 100° silicone oil) to prevent the epoxy resin from adhering thereto when it hardens, and then positioning the mold halves 6 and 7 on the arbor with the base member element 11 positioned in the mold half recess 9 as shown in FIG. 1. The portion of the base member aperture 12 surrounding the arbor 8 is sealed in a suitable manner, as for example by placing tape or clay therein, so that the material will not flow out of the forming cavity. Epoxy resin is then poured through the feed passage 16 to fill the forming cavity 13, 14. The epoxy resin will set in approximately one hour to form the element 17 and in setting will shrink slightly away from the arbor to form a clost fit therewith, whereby subsequent machining of the element aperture 19 will not be necessary as in the case of conventional metal arbor strippers.

After the epoxy resin has set to a hard mass the mold halves 6 and 7, base member 11 and formed epoxy resin element 17 may be removed from the arbor. The side surface of the epoxy resin element 17 which is to engage the would material is then machined to present a smooth material engaging surface 21 (FIG. 2), and the tape or clay used to seal the aperture 12 is removed therefrom, whereupon the completed stripper may be secured in its operating position on the winding device in a conventional manner, as for example, in the frame thereof by set screws.

When the arbor stripper consisting of the metal base member 11 and epoxy resin element 17 has been mounted in operating position on the winding device and the arbor 8 has been passed through the apertures 12 and 19 into winding position, the capacitor material may be wound on the arbor as shown at 22 in FIG. 3. After the desired amount of material has been wound on the arbor, the arbor is moved with respect to the stripper 11, 17 by conventional means, such as a hydraulic ram, whereby the poxy resin element surface 21 comes into engagement with the wound material and, because of the close tolerance between the epoxy resin element 17 and the arbor 8, the element 17 readily strips the wound material from the arbor.

While the above-described method utilizes a pair of mold halves 6 and 7, and a metal base member 11 to which the epoxy resin element 18 is cast, it is contemplated that the mold half 6 could be eliminated and the metal base member 11 clamped directly to the mold half 7, or that the base member 11 could be eliminated and the epoxy resin element cast directly on the arbor in the recesses 9 and 14 in the mold halves 6 and 7, respectively. It is also contemplated that instead of forming each stripper element directly on the arbor with which it is to be used, stripper elements could be formed on a master arbor for use on other arbors, or stripper elements could be interchanged from one arbor to another, providing the arbors were all constructed to substantially the same dimensions. Accordingly, where reference is made herein to the molding of an element, such as a stripper element, to a member, such as an arbor, with which said element is to cooperate, it is intended that such reference be interpreted broadly enough to include the molding of the element to one member and the use of the element with another member of like dimensions. Further, while material other than epoxy resin could be used, epoxy resin is preferred because of its property of setting to a hard mass with a minimum of shrinkage, whereupon it attains certain properties similar to steel, resulting in a stripper element capable of being machined and having a low rate of wear.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. The method of making an assembly wherein first and second members of the assembly are movable linearly relative to one another and cooperating surfaces of the members are formed to close tolerances with respect to one another whereby the members are closely restricted to relative linear movement, said method comprising the steps of forming a surface on the first member parallel to the desired direction of relative linear movement of the members, and then forming the second member by molding a substantially liquid material, which is capable of solidifying into a rigid mass, against said formed surface.

2. The method of making an assembly wherein first and second members of the assembly are movable linearly relative to one another and peripheral surfaces of the first member and cooperating surfaces of the second member are formed to close tolerances with respect to one another whereby the members are closely restricted to relative linear movement, said method comprising the steps of forming said peripheral surfaces on the first member parallel to the desired direction of relative linear movement of the members, and then forming the second member in encircling relationship with respect to said first member by molding a substantially liquid material, which is capable of solidifying into a rigid mass, against said formed peripheral surfaces.

3. The method of making an assembly wherein first and second members of the assembly are movable linearly relative to one another and cooperating surfaces of the members are formed to close tolerances with respect to one another whereby the members are closely restricted to relative linear movement, said method comprising the steps of forming a surface on the first member parallel to the desired direction of relative linear movement of the members, coating a portion of said formed surface with a release agent whereby a member molded in contact with said formed surface will not adhere thereto, and then forming the second member by molding a substantially liquid material, which is capable of solidifying into a rigid mass, in contact with the coated portion of said formed surface.

4. The method of making an assembly wherein first and second members of the assembly are movable linearly relative to one another and cooperating surfaces of the members are formed to close tolerances with respect to one another whereby the members are closely restricted to relative linear movement, said method comprising the steps of forming a surface on the first member parallel to the desired direction of relative linear movement of the members, coating a portion of said formed surface with a release agent whereby a member molded in contact with said formed surface will not adhere thereto, and then molding epoxy resin in contact with the coated portion of said formed surface to form the second member.

5. The method of making a carrying member and stripper assembly wherein the stripper may serve to remove a thin layer of material from the carrying member by relative linear movement of the stripper and the carrying member, said method comprising the steps of forming the carrying member to a substantially uniform lateral cross-section, coating a portion of the carrying member around its entire periphery with a release agent whereby an element molded in contact with the coated portion of the carrying member will not adhere thereto, and then molding an epoxy resin element in encircling relationship with respect to the carrying member and in contact with the coated portion of the carrying member.

6. The method of making a carrying member and stripper assembly wherein the stripper may serve to remove a thin layer of material from the carrying member by relative linear movement of the stripper and the carrying member, said method comprising the steps of forming the carrying member to a substantially uniform lateral cross-section, coating a portion of the carrying member with a release agent whereby an element molded in contact with the coated portion of the carrying member will not adhere thereto, and then molding an epoxy resin element in contact with the coated portion of the carrying member to become integral with a base member slidably mounted on the carrying member for linear movement with respect thereto.

7. The method of making a carrying member and stripper assembly wherein the stripper may serve to remove a thin layer of material from the carrying member by relative linear movement of the stripper and the carrying member, said method comprising the steps of forming the carrying member to a substantially uniform lateral cross-section, forming an aperture slightly larger than the cross-section of said carrying member in a base member, mounting said base member on said carrying member, coating a portion of said carrying member adjacent the base member aperture with a release agent whereby an element molded in contact with said coated portion of the carrying member will not adhere thereto, and then molding an epoxy resin element in contact with said base 13 member and said coated portion of the carrying member so that the element becomes integral with said base member.

8. The method of making a winding arbor and stripper assembly wherein the stripper may serve to remove a thin layer of wound material from the winding arbor by relative linear movement of the stripper and the winding arbor, said method comprising the steps of forming the winding arbor to a substantially uniform lateral cross-section, forming an aperture slightly larger than the cross-section of said arbor in a base member, forming a recess in said base member so that the aperture will open into the recess at one end around the entire periphery of the aperture, mounting said base member on said arbor, coating a portion of said arbor adjacent the base member recess with a release agent whereby an element cast around said coated portion of the arbor will not adhere thereto, and then casting an epoxy resin element around said coated portion of the arbor in the recess of the base member.

References Cited in the file of this patent

UNITED STATES PATENTS

| | | |
|---|---|---|
| 2,683,572 | Morin | July 13, 1954 |
| 2,761,349 | Heller | Sept. 4, 1956 |
| 2,870,812 | Heller | Jan. 27, 1959 |